(12) United States Patent
McGervey et al.

(10) Patent No.: US 7,816,034 B2
(45) Date of Patent: Oct. 19, 2010

(54) HIGH-POWER BATTERY

(76) Inventors: Donald L. McGervey, 1819 Wilton Rd., Cleveland Heights, OH (US) 44118; Paul T. Szozdowski, 21610 Miller Ave., Euclid, OH (US) 44119; Gerhard E. Welsch, 2514 Edgehill, Cleveland Heights, OH (US) 44106

( * ) Notice: Subject to any disclaimer, the term of this patent is extended or adjusted under 35 U.S.C. 154(b) by 390 days.

(21) Appl. No.: 11/836,764

(22) Filed: Aug. 9, 2007

(65) Prior Publication Data
US 2009/0042101 A1 Feb. 12, 2009

(51) Int. Cl.
H01M 4/48 (2006.01)
H01M 4/50 (2006.01)
H01M 4/52 (2006.01)
H01M 4/56 (2006.01)

(52) U.S. Cl. .................. 429/220; 429/218.1; 429/221; 429/223; 429/224; 429/228; 429/231; 429/231.5

(58) Field of Classification Search .................. 429/220
See application file for complete search history.

(56) References Cited

U.S. PATENT DOCUMENTS

| 6,346,343 B1 * | 2/2002 | Notten et al. ................. 429/60 |
| 6,495,021 B2 * | 12/2002 | Welsch et al. ............... 205/149 |
| 2005/0019668 A1 * | 1/2005 | Yamamoto et al. .......... 429/317 |

* cited by examiner

*Primary Examiner*—Patrick Ryan
*Assistant Examiner*—Brent Thomas
(74) *Attorney, Agent, or Firm*—Tarolli, Sundheim, Covell & Tummino LLP

(57) ABSTRACT

A method of forming battery electrodes with high specific surface and thin layers of active material is disclosed. The method enables low series resistance and high battery power.

14 Claims, 6 Drawing Sheets

HIGH-POWER BATTERY

US PATENTS CITED

G. P. Klein, U.S. Pat. No. 3,412,444 (1968)
W. Mizushima et al., U.S. Pat. No. 4,041,359 (1977)
J. Fife et al., U.S. Pat. No. 5,245,514 (1993)
J. Bates et al. U.S. Pat. No. 5,338,625 (1994)
X. Bi et al., U.S. Pat. No. 5,952,125 (1999)
N. Bando et al., U.S. Pat. No. 5,965,295 (1999)
G. Welsch and D. McGervey, U.S. Pat. No. 6,226,173 (2001)
G. Welsch and D. McGervey, U.S. Pat. No. 6,495,021 (2002)
S. Kawakami et al., U.S. Pat. No. 6,558,847 (2003)
S. Nordlinder et al., U.S. Pat. No. 6,653,022 (2003)
D. I. Ghantous and A. A. Pinoli, U.S. Pat. No. 7,198,869 (2007)

REFERENCES CITED

G. V. Samsonov (ed.) The Oxide Handbook, $2^{nd}$ edition, IFI/Plenum Data Company (1982) 202-203
E-S. Megahed et al. (eds.) The Electrochemical Society Proceedings Series PV 94-28 (1995)
A. L. Tipton et al., J. Electrochemical Society, 143, Nov. 11 (1996) 3473-3477
L. D. Kadan and P. S. Patil, Materials Chemistry and Physics, 68 (2001) 225-232
D. Lisjak et al., Solid State Ionics, 99 (1997) 125-135

BACKGROUND OF INVENTION

The electrodes of a battery are an electrically conductive anode and an electrically conductive cathode. Each has a layer of active material which can react with an electrolyte to either liberate or absorb electrons. When an electron is liberated at the interface of an active material and electrolyte it must travel through the active material and through the negative electrode, then through an external circuit to the positive electrode, and through another layer of active material where it is absorbed at the interface of the other active material with electrolyte. Each layer of material that electricity must travel through has a certain resistivity. The electrical resistance R of a layer is determined by equation 1.

$$R=\rho L/A \qquad \text{equation (1)}$$

$\rho$ is the resistivity of the material, L is the length electricity must travel through the material, and A is the cross section area of the path that electricity takes through the material. For a given material volume V the resistance is determined by equation 2.

$$R=\rho L^2/V \qquad \text{equation (2)}$$

Since the resistance of a given volume of material in a layer is proportional to the square of the electricity's path length through a material it is important to make the electrical path through the material with the highest resistivity as short as possible. Active materials often have a high resistivity and cause a high series resistance in a battery. [Lisjak et al., (1997), Megahed (1995), Samsonov (1982)]

Prior art inventions use a paste to form a layer of active material between the metal electrode and the electrolyte [Bando et al. (1999), Bi et al. (1999), Nordlinder (2003) and Ghantous (2007)]. Typically, the layer of active material is between several hundred micrometers to over one millimeter thick and not fully dense. A battery with a thick layer of active material has a high electrical resistance through the active material and has low power. Some prior art batteries use fine powders or nano particles of active material to increase the surface area. However, if electrons or ions must travel through several particles of resistive material to reach the next layer of less resistive material the resistive path length is long and the resistance is high. A high-power battery must have a thin layer of active material and a high specific area to minimize the electrical path length and minimize the resistance. Thin film batteries have been used in prior art (Bates et al. (1994), Tipton et al. 1996) to obtain low series resistance; however, they have low cathode loadings (e.g., 0.013 mAh/cm$^2$) or low energy per projected area. Prior art thin film batteries have not realized high volume fractions of active material and have low energy density. In practical non-thin-film batteries one desires much higher cathode loadings, e.g. one-thousand times larger.

For capacitive energy storage, electrodes have been developed with very high surface to volume ratio [Welsch and McGervey 2001 and 2002, G. P. Klein (1968), W. Mizushima et al. (1977), J. Fife et al. (1993)] but such electrodes have not found use in batteries.

In the present invention we describe a new battery electrode that achieves the goal of lower series resistance and higher power than in prior art.

SUMMARY OF THE INVENTION

Our battery consists of a conductive anode material, e.g., a metal, an 'anode active material', an electrolyte, a conductive cathode material, e.g., a metal, and a 'cathode active material'. Anode and cathode comprise a 'metal backbone' or a 'metal spine' with an open-porous metal layer or metal sponge of high surface area. The porous metal layer is relatively thin and comprises even thinner metal branches and open pores. The surface layer of the metal sponge is converted into a thin layer of active material by a chemical reaction.

The electrodes are arranged so that the anode surface is within a short distance of the cathode surface to present a short path length through the electrolyte for low electrolyte resistance. The active material is in the form of a thin layer on the electrodes' sponge surface. When formed by chemical reaction it can be made thinner than an active material layer made from particles or paste. When the active material has the highest resistivity amongst the battery materials it is important that its layer thickness is thin. FIG. 1 shows the path length of electricity in the materials of a battery, in the metal (M), electrolyte (E), and active material (A).

DETAILED DESCRIPTION OF PREFERRED EMBODIMENTS

Battery electrodes are made from a 'metal backbone' or a 'metal spine' with an open-porous metal layer of high surface area comprising one or more elements of the active material.

Figure 1:
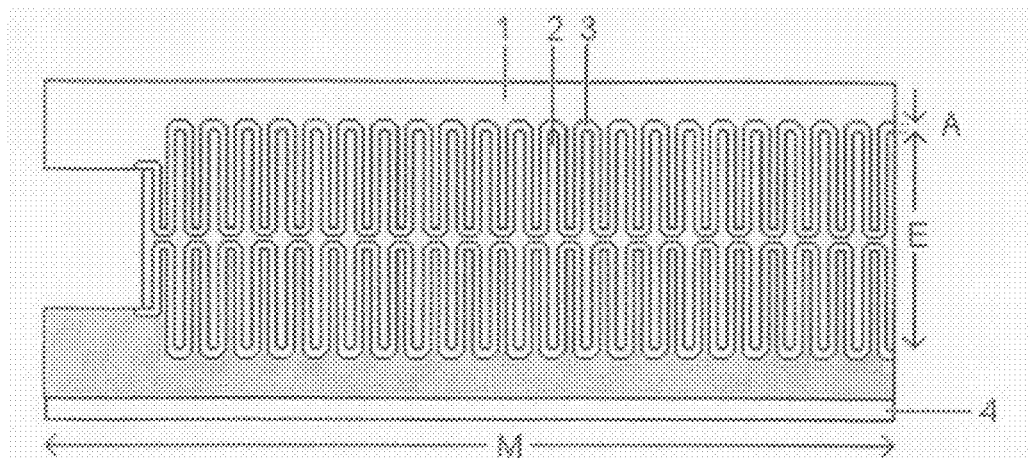
FIG. 1 is a battery with thin porous electrodes with active material covering the surface of the electrodes. The layer of active material is very thin and has a high specific surface area.
Figure 2:
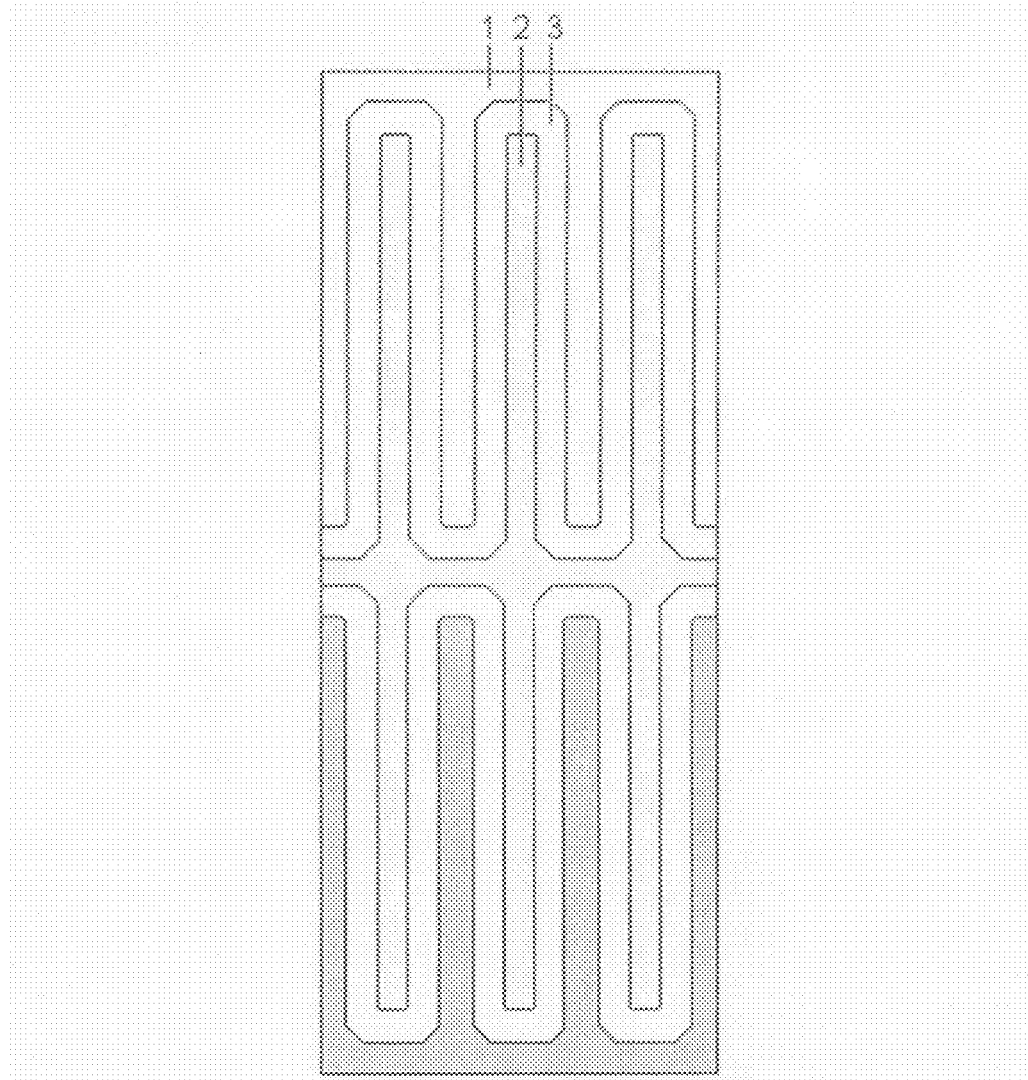
FIG. 2 is a close-up picture of the pores of FIG. 1 showing how the active material covers the pore surface.

The surface of the electrode is chemically reacted with other elements to form a thin film of active material over the surface of the electrode. The active material is typically an oxide, hydroxide, hydride, or salt of the electrode metal. It can be grown thermally, chemically or electrochemically. An anode electrode and a cathode electrode are placed in close proximity of each other with an electrolyte between them to form a battery. FIG. 1 is a battery with porous electrodes covered with thin active material and with electrolyte between the electrodes. The metal (1) has an electrical path length (M), the electrolyte (2) has an electrical path length (E), and the active material (3) has an electrical path length (A). FIG. 2 is an enlarged view of the metal (1), the electrolyte (2), and the active material (3). The active material has the highest resistivity of the battery components. For low resistance and high power, it has a short electrical path length and preferably the shortest electrical path length of the components. The electrolyte has the next highest resistivity and, therefore, the next shortest path length. The metal electrodes are the most conductive parts of the battery and have the longest path lengths. Typical values of resistivity, path length, and resistances of battery components are listed in Table 1.

TABLE 1

Battery components, electrical path lengths, resistivities, and resistances

|  | Active Material | Electrolyte | Metal |
| --- | --- | --- | --- |
| Path Length | 1 nm to 10 μm | 1 μm to 1 mm | 1 mm to 1 m |
| Resistivity | $10^3$ to over $10^8$ Ω-cm | 1 to 500 Ω-cm | $10^{-6}$ to $10^{-4}$ Ω-cm |
| Resistance of 1 $cm^3$ volume | $10^{-11}$ to 1 Ω | $10^{-8}$ to 5 Ω | $10^{-8}$ to 1 Ω |

Table 2 lists batteries that can be made with beneficial resistance and power according to the disclosed method. It shows the metals used to form certain active materials. Materials for electrodes, active materials and electrolytes are also listed.

TABLE 2

Materials of battery components and ionization states

| | | Negative Electrode | | Positive Electrode | |
| --- | --- | --- | --- | --- | --- |
| Battery Type | Electrolyte | Anode Active Material in Charged Battery | Anode Active Material in Discharged Battery | Cathode Active Material in Charged Battery | Cathode Active Material in Discharged Battery |
| Lead/Acid | Sulfuric Acid | Lead | Lead Sulfate $PbSO_4$ | Lead oxide $PbO_2$ | Lead Sulfate $PbSO_4$ |
| Ionization state | | $Pb^0$ | $Pb^{2+}$ | $Pb^{4+}$ | $Pb^{2+}$ |
| Nickel Metal Hydride | | Metal plus hydrogen solid solution or metal hydride | H-storage alloy | NiO(OH) | $Ni(OH)_2$ |
| Ionization state | $(OH)^-$ aq. | $M^-$ | $M^0$ | $Ni^{3+}$ | $Ni^{2+}$ |
| Nickel/Cadmium | | Cadmium | $Cd(OH)_2$ | $NiO_2$ | $Ni(OH)_2$ |
| Ionization state | $(OH)^-$ aq. | $Cd^0$ | $Cd^{2+}$ | $Ni^{4+}$ | $Ni^{2+}$ |
| Carbon/Zinc | | Zinc | $Zn(OH)_2$ | $MnO_2$ | $Mn_2O_3$ |
| Ionization state | $(OH)^-$ aq. | $Zn^0$ | $Zn^{2+}$ | $Mn^{4+}$ | $Mn^{3+}$ |
| Lithium ion battery | Conducting polymer | Lithium metal | Lithium metal | Low conc. of $Li^+$ ions in solid solution in metal oxide | High conc. of $Li^+$ ions in solid solution in metal oxide |
| Ionization state | $Li^+$-ion | $Li^0$ | $Li^0$ | $Li^+$ | $Li^+$ |

Figure 3:
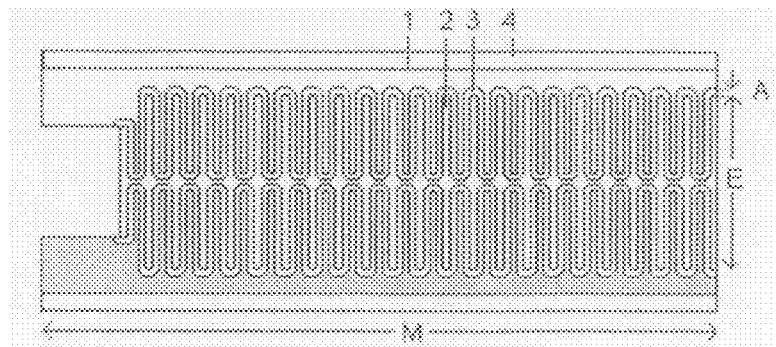
FIG. 3 is a battery with thin porous electrodes with a metal on the outer portion of the electrodes that has a higher conductivity than the sponge-forming metal of the electrodes.
Figure 4:
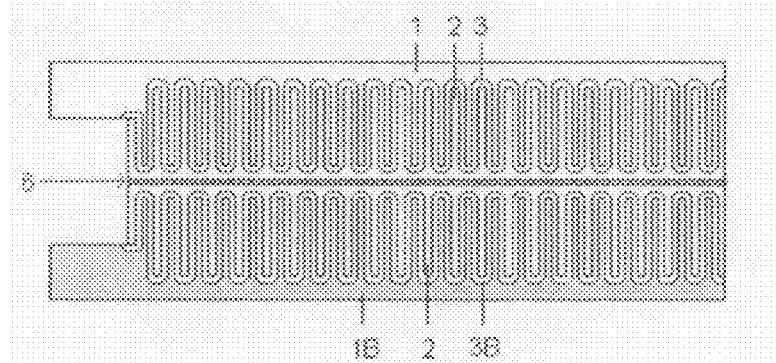
FIG. 4 is a battery with a porous spacer or membrane to separate the two electrodes.

The metal 'backbone' or the 'spine' of an electrode usually has the longest conduction path and must have the lowest resistivity. FIG. 3 is a battery with a low-resistivity metal (4) attached to the electrode metal (1) to reduce the resistance of the electrode. In an embodiment shown in FIG. 4 a porous membrane (6) is placed between the anode and cathode electrodes to prevent the electrodes (1 and 1B) from touching. The membrane reduces the risk of electronic self discharge of the battery while allowing ions in the electrolyte to flow freely between the electrodes.

Figure 5:
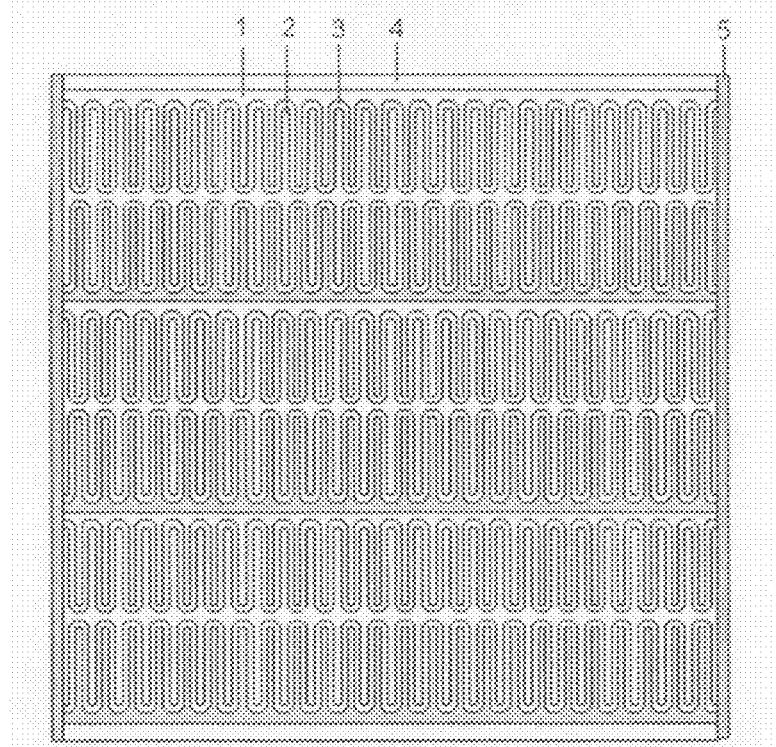
FIG. 5 is a battery consisting of several cells in series to increase voltage.

Several cells can be stacked in series to make a higher voltage battery as in FIG. 5. Each cell has electrodes (1), electrolyte (2), and active material (3). High conductivity metal (4) is at the positive and negative terminals. The whole battery is packaged in an insulating case (5).

Figure 6:
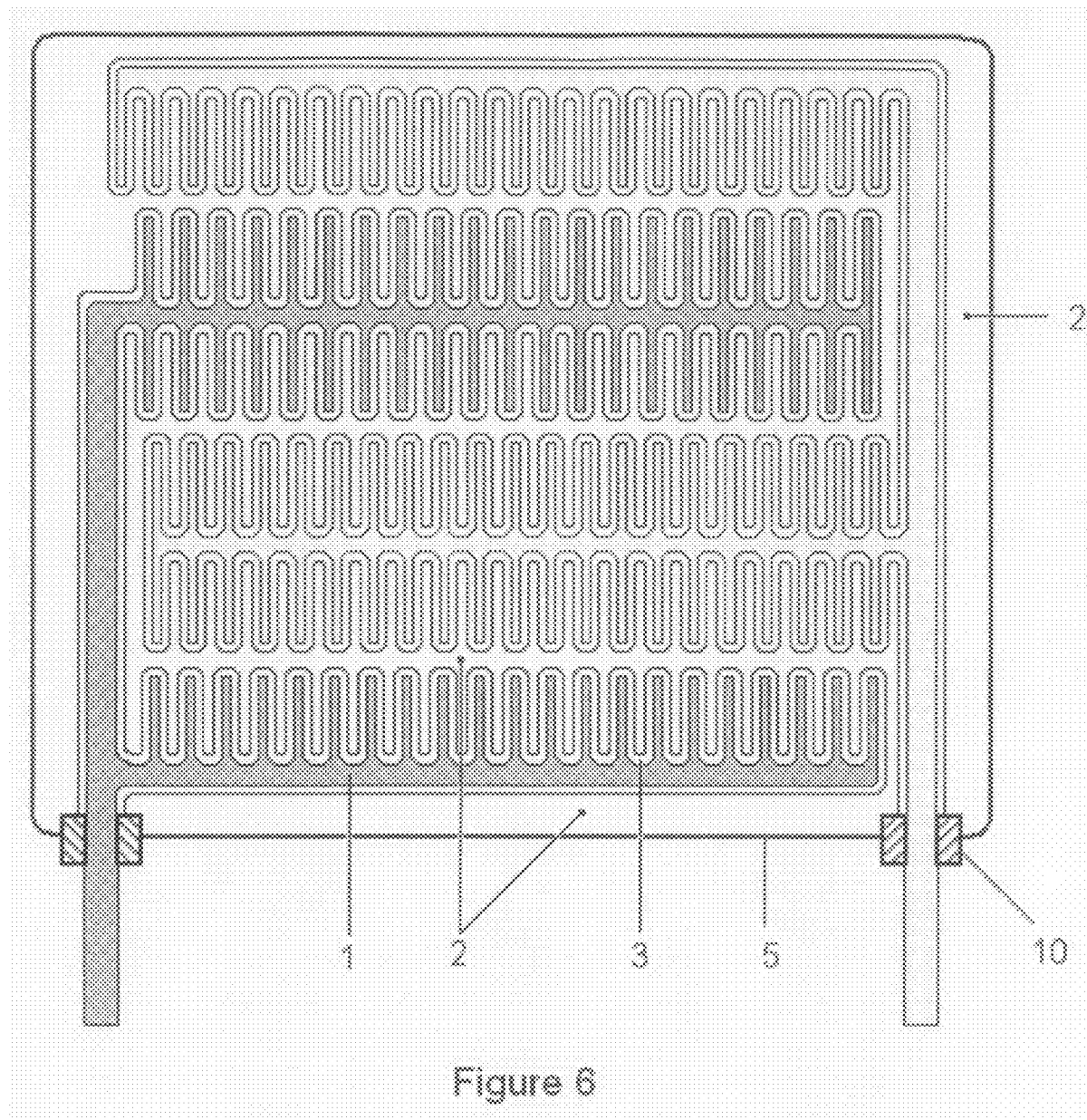
FIG. 6 is a battery with several cells in parallel to increase current.

In FIG. 6 several electrodes are placed in parallel to form a higher current battery. The battery comprises electrodes (1), electrolyte (2), active material (3), insulation (10), and a casing (5) that envelopes electrolyte and electrodes.

Figure 7:
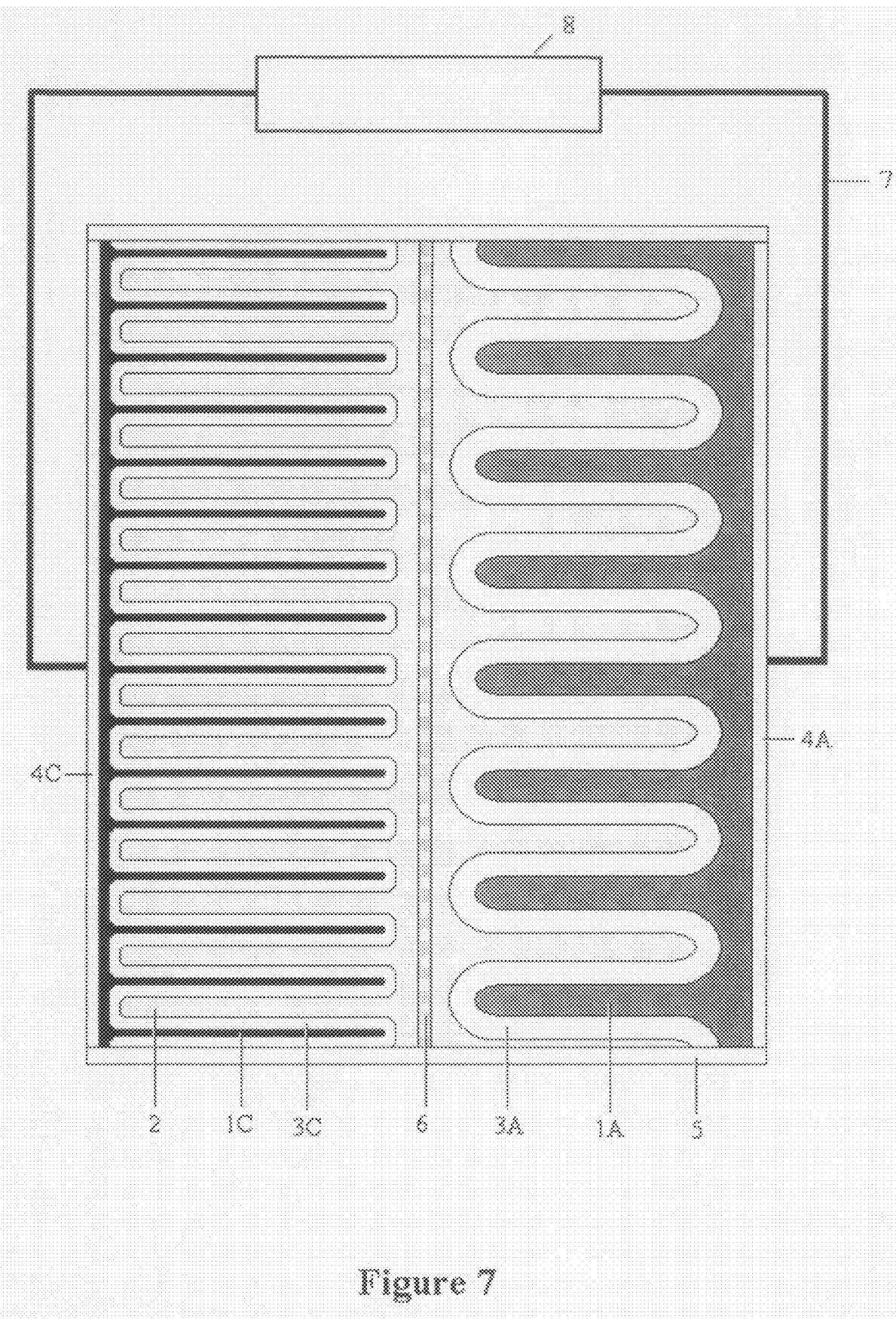
FIG. 7 is a battery connected to a load.

FIG. 7 depicts a battery connected to a load. The battery comprises an anode electrode (1A), a cathode electrode (1C), electrolyte (2), anode active material (3A), cathode active material (3C), high-conductivity metal at the anode terminal (4A), high-conductivity metal at the cathode terminal (4C), insulating case (5), porous membrane (6), lead wires (7), and a load (8). The anode and cathode electrodes comprise high-surface-area metal sponges covered with thin layers of anode- and cathode active materials.

Figure 8:
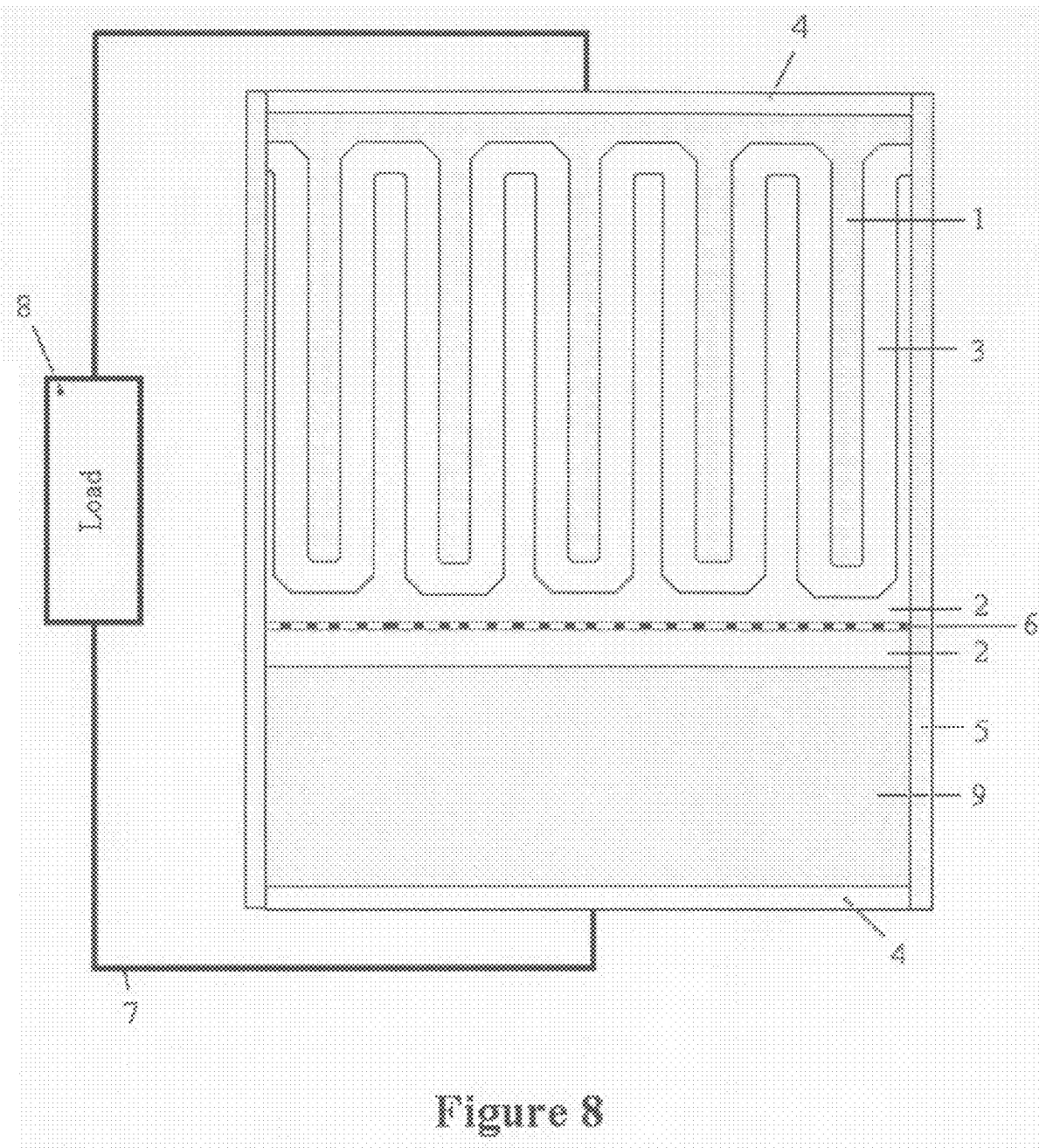
FIG. 8 is a lithium ion battery with a sponge cathode.

In the embodiment depicted in FIG. 8 a lithium ion battery has a metal sponge cathode (1) made by the present invention. The metal has low electrical resistivity; the metal oxide can absorb lithium ions. Preferably, the cathode sponge material comprises one or more of the elements Ti, V, Cr, Mn, Zr, Co, Mo, W, Cu, Ni and Fe. The porous metal cathode (1) is oxidized to form an oxide surface layer on its surface (3). It serves as active material. In an alternative embodiment the active material is $MnO_2$ and is formed on the surface of the cathode by the decomposition of manganese nitrate or manganese sulfate. The cathode and active material are in an electrolyte with a lithium ion source (9) that is separated from them by a porous membrane (6). The lithium ion source can be lithium metal, lithium alloy, or lithium ions absorbed in an ion-absorbing matrix such as graphite or carbon composite.

Figure 9:
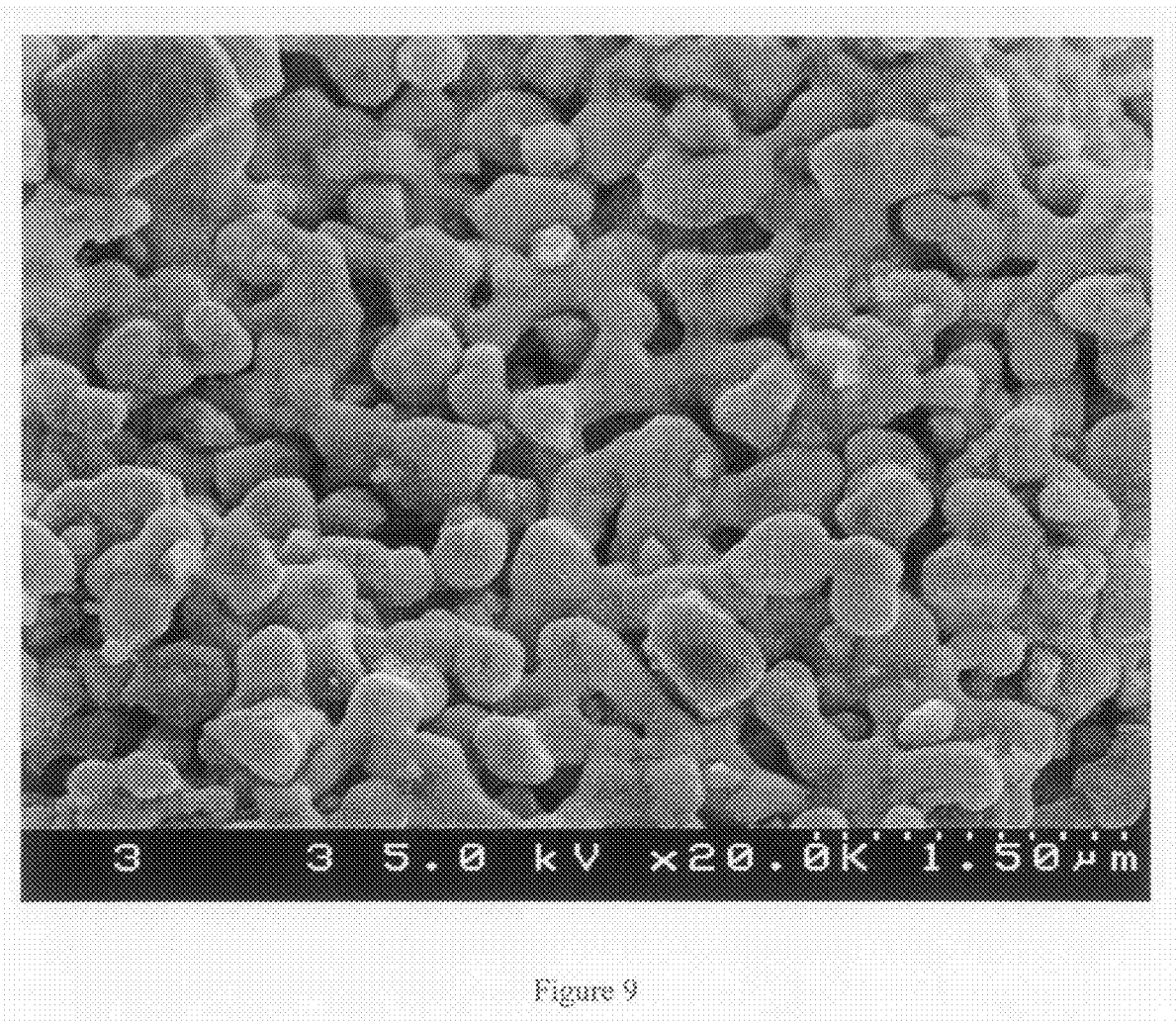
FIG. 9 is a scanning electron microscope image of porous metal electrode with a thin oxide surface layer.

FIG. 9 is a scanning electron microscope image of a porous metal electrode with a thin oxide surface layer of 40 to 50 nm thickness. It is similar in design to a capacitor electrode. Batteries have substantially higher series resistance than electrolytic capacitors because batteries have a high electrical resistance in their active material. A battery with a geometry shown in FIG. 9, with a high surface area electrode and a thin layer of active material covering the electrode's surface, has a series resistance comparable to that of an electrolytic capacitor, except for additional resistance of the battery's active material. Our electrode design minimizes this additional resistance.

The active material of a battery electrode is made in a similar manner as the formation of a capacitor dielectric. The difference is that the battery electrode forms a layer of active material whereas a capacitor electrode forms a layer of insulating dielectric. First a metal sponge is made; then its surface is chemically reacted to form a thin layer of the active material. In this process no powder or paste is used to form the active material. Vanadium sponge with a thin layer of vanadium oxide or silver-vanadium oxide is a good positive electrode for a lithium-ion battery. Nickel sponge with a thin layer of nickel oxide or nickel hydroxide is a good electrode for a nickel-cadmium or a nickel-metal-hydride battery. Likewise, zinc with a porous high-surface layer can be used as an electrode in a carbon-zinc battery, and lead or lead-alloy with a high surface area covered with lead oxide can be used as an electrode in a lead-acid battery.

The electrode in FIG. 9 has a sponge depth of sixty micrometers, a surface area of ten square meters per cubic centimeter, and an oxide thickness of fifty nanometers. Half the total volume is oxide. A battery electrode of this geometry would have a sixty micrometer path length through the electrolyte and a fifty nanometer path length through the active material. Typically an electrode comprises a metal sponge of one micrometer to one millimeter thickness and a pore size between five nanometers and thirty micrometers. The active material of the battery is a compound comprising one or more elements of the metal sponge and is typically formed before the assembly of the battery. It can be an oxide, hydroxide, or salt of the electrode metal and is produced by chemical or electrochemical reaction at low or elevated temperature. The active material layer has a layer thickness between one nanometer and ten micrometers. Typically the active material has a volume between five and ninety-five percent of the battery volume.

Metal sponges for battery electrodes in this invention are made by manufacturing methods similar to those for making porous high-surface-area capacitor electrodes, e.g., by sintering of metallic sponge powder or by reduction-processing of an oxide or salt, or by etching of a metal or alloy. In an alternative embodiment the battery electrode is made from a connected body of metallic branches or fins of high surface area. The thickness of the branches or fins is preferably between 5 nm and 30 μm.

Example 1

Table 3 shows the resistances of active material of 1 $cm^3$ volume of a comparison battery in which the active material is made (from a paste) with a layer thickness of 100 μm and a battery of the present invention in which the active material is an oxidation-formed layer of 50 nm thickness. The assumed resistivity ρ is 100,000 Ω-cm for each active material. The ratios are of the thicknesses and resistances of the active materials in the comparison battery and the battery of the present invention. Batteries with lower series resistance have higher power.

TABLE 3

|  | Comparison battery | Present invention | Ratio |
|---|---|---|---|
| Active material layer thickness | 100 μm | 50 nm | 2000:1 |
| Resistance R = ρ $L^2$/V | 10 Ω | 2.5 μΩ | 4,000,000:1 |

Example 2

Table 4 shows a comparison of electrodes of a thin-film battery with active material deposited on a flat substrate of 25 μm thickness and an electrode of a battery of the present invention with a metal sponge of 10 $m^2$ surface area per $cm^3$. Each electrode has an active material layer of 50 nm thickness. The total volume of each electrode is 1 $cm^3$. The ratios show that the battery of the present invention has more active material per unit volume and therefore more energy and power than a prior art thin-film battery.

TABLE 4

|  | Thin-film battery | Present invention | Ratio |
|---|---|---|---|
| Area of active material | 400 $cm^2$ | 10 $m^2$ | 1:250 |
| Volume of active material | 2 $mm^3$ | 500 $mm^3$ | 1:250 |

Batteries made by the present invention have the following unique characteristics:
1. The electrodes of the battery have at least one side comprising high porosity metal sponge with interconnected dendrites or interconnected metal branches having small feature size and high specific surface area.
2. The active material of the battery is a thin layer or film covering the surface of the electrode.

3. The active material is formed on the surface of the electrode by a chemical reaction prior to installation in a battery or prior to use of the electrode.

Advantages are:
1) A thin layer of active material with a high area has low series resistance and enables a battery to have high power. Power can be over 1000 Watt per cubic centimeter of battery.
2) Battery power will remain high through the discharge cycle even when the active material has high electrical resistivity.
3) Chemical-reaction-formed active material covers the electrode more continuously than do pastes in prior art batteries. This reduces direct physical contact between electrode metal and electrolyte. It also reduces self discharge of the battery.
4) Active material of the present invention tends to be more adherent to the electrode than the active material of prior art. This increases charge/discharge cycle life.

Having described the present invention we claim:

1. A battery electrode comprising an open-porous metal of at least 1000 square centimeters surface area per cubic centimeter volume, the open-porous metal including a conductive portion and a surface portion that is an oxide, hydroxide, or a salt of the open-porous metal, the surface portion having a higher resistivity than the conductive portion and defining an active material of the battery electrode.

2. A battery electrode comprising an open-porous metal sponge or open-porous metal structure, the open porous metal sponge or open porous metal structure including a conductive portion and a surface portion with a higher resistivity than the conductive portion, the surface portion of the open porous metal sponge or open porous metal structure defining a surface layer of active material that is formed from the open porous metal sponge or open porous metal structure.

3. The battery electrode of claim 1, the active material consisting of oxidized open-porous metal of the surface portion of the electrode.

4. The battery electrode of claim 1, the active material being a layer of less than 10 μm thickness.

5. The battery electrode of claim 1, the active material being a layer of less than 500 nm thickness.

6. A battery comprising electrodes of claim 1 and having a power density of more than 1 Watt per cubic centimeter.

7. A battery comprising electrodes of claim 1 and having a power density of 1 to 1000 Watt per cubic centimeter.

8. A battery having an electrode of claim 1 and having high power through most of the discharge cycle.

9. The battery electrode of claim 1, comprising one or more of the elements Ti, V, Cr, Mn, Zr, Co, Mo, W, Cu, Ni, Fe, Pb, Zn and the active material being an oxide of the electrode material.

10. The battery electrode of claim 1 used as a cathode of a lithium-ion battery.

11. The battery electrode of claim 1 used in a nickel-metal-hydride battery.

12. The battery electrode of claim 1 used in a lead-acid battery.

13. The battery electrode of claim 1 used in a nickel-cadmium battery.

14. The battery electrode of claim 1 used in a carbon-zinc battery.

\* \* \* \* \*